(12) United States Patent
Matsuda et al.

(10) Patent No.: US 11,594,899 B2
(45) Date of Patent: Feb. 28, 2023

(54) MOBILE INFORMATION PROCESSING DEVICE, INTEGRATED CIRCUIT, AND BATTERY PACK

(71) Applicant: SEIKO EPSON CORPORATION, Tokyo (JP)

(72) Inventors: Kinya Matsuda, Suwa (JP); Kota Onishi, Shiojiri (JP); Masahiko Tsuchiya, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 1129 days.

(21) Appl. No.: 16/201,001

(22) Filed: Nov. 27, 2018

(65) Prior Publication Data

US 2019/0165587 A1 May 30, 2019

(30) Foreign Application Priority Data

Nov. 28, 2017 (JP) .............................. JP2017-227577

(51) Int. Cl.
*H02J 7/00* (2006.01)
*H01M 10/48* (2006.01)
*H01M 10/42* (2006.01)
*H01M 10/46* (2006.01)
*H02J 7/35* (2006.01)

(52) U.S. Cl.
CPC ......... *H02J 7/0031* (2013.01); *H01M 10/425* (2013.01); *H01M 10/46* (2013.01); *H01M 10/48* (2013.01); *H01M 2010/4271* (2013.01); *H02J 7/00306* (2020.01); *H02J 7/35* (2013.01)

(58) Field of Classification Search
None
See application file for complete search history.

(56) References Cited

U.S. PATENT DOCUMENTS

| 5,493,197 A | * | 2/1996 | Eguchi | H02J 7/0014 320/134 |
| 2003/0128010 A1 | * | 7/2003 | Hsu | H02J 7/35 320/101 |
| 2010/0129700 A1 | | 5/2010 | Tanno | |

FOREIGN PATENT DOCUMENTS

| JP | 2010-124640 A | 6/2010 |
| JP | 2012-175877 A | 9/2012 |

* cited by examiner

*Primary Examiner* — Arun C Williams
(74) *Attorney, Agent, or Firm* — Rankin, Hill & Clark LLP (57) ABSTRACT

An integrated circuit includes: an over-discharge detection circuit that is supplied with electric power from a secondary battery, and is configured to detect whether or not the secondary battery is in an over-discharged state, and upon detecting that the secondary battery is in an over-discharged state over a predetermined period, stop a detection operation according to an enable signal; and a power down cancel circuit configured to, when the over-discharge detection circuit has stopped the detection operation, cause the over-discharge detection circuit to re-start the detection operation when a current supplied to a detection terminal from a power feeding circuit is a predetermined current or more.

7 Claims, 8 Drawing Sheets

MOBILE INFORMATION PROCESSING DEVICE, INTEGRATED CIRCUIT, AND BATTERY PACK

BACKGROUND

1. Technical Field

The present invention relates to a mobile information processing device including a chargeable secondary battery. Furthermore, the invention relates to an integrated circuit, a battery pack, and the like that are used in such a mobile information processing device.

2. Related Art

In recent years, mobile information processing devices that use electric power generated by a power generator such as a solar cell have become widely used. In such a mobile information processing device, electric power generated by a power generator is stored in a secondary battery, and as a result, electronic circuits can be operated by electric power supplied from the secondary battery.

Also, in order to protect the secondary battery from over-discharge, a battery protection circuit that monitors whether or not the secondary battery is in an over-discharged state using an over-discharge detection circuit and opens and closes the discharging path between the secondary battery and a load circuit is provided in the mobile information processing device. For example, a portion of the battery protection circuit is incorporated in an integrated circuit (IC), and the battery protection circuit constitutes a battery pack along with the secondary battery.

When an over-discharged state of the secondary battery is detected, the battery protection circuit stops supplying electric power from the secondary battery to the load circuit. However, if the over-discharge detection circuit thereafter continues a detection operation while being supplied with electric power from the secondary battery, the over-discharged state of the secondary battery worsens due to the consumption current of the over-discharge detection circuit. Also, when the battery pack is stored for a long period of time, for example, unnecessary power consumption cannot be reduced, and the power consumption of the battery pack increases.

As a related technology, in JP-A-2010-124640, an integrated circuit for over-charge/discharge protection is disclosed that can suppress power consumption when an over-discharged state is detected. The units of the integrated circuit operate continuously in a normal state other than a power down mode. On the other hand, when the voltage of the secondary battery is detected to be an over-discharge voltage or less, and the power down mode is entered, the units of the integrated circuit only perform an operation to detect whether or not the voltage of the secondary battery has reached a predetermined restoration voltage, and as a result, the power consumption of the battery pack can be suppressed.

According to JP-A-2010-124640, as a result of reducing the power supply voltage generated by a power supply unit of the integrated circuit during the power down mode, the current supplied from the secondary battery to the integrated circuit can be reduced to 1 μA or less, for example. However, the power consumption of the over-discharge detection circuit cannot be reduced to zero, and therefore the over-discharged state of the secondary battery worsens. If the voltage of the secondary battery has decreased to 0 V, and the secondary battery cannot be recharged, the mobile information processing device needs to be repaired in order to replace the secondary battery.

Also, according to JP-A-2010-124640, the secondary battery is charged by connecting a charging device such as an AC adapter having sufficient power supply capability to the secondary battery. Therefore, even if the power down mode of the integrated circuit is cancelled immediately after charging has started, sufficient electric power can be stored in the secondary battery. On the other hand, in the technology disclosed in JP-A-2010-124640, a situation in which the secondary battery is charged using an unstable power generator such as a solar cell is not envisioned.

When the secondary battery is charged by electric power supplied from a power feeding circuit connected to an unstable power generator such as a solar cell, the power supply capability of the power feeding circuit changes according to the usage environment such as ambient brightness, and as a result, there are cases where the power feeding circuit can only supply a current that is smaller than the consumption current of the over-discharge detection circuit. If the power down mode is cancelled as a result of the voltage of the secondary battery having reached a predetermined voltage in such a case, the insufficient current is supplied from the secondary battery in order to operate the over-discharge detection circuit, and as a result, the stored electric power is consumed, that is, electric power is consumed from the secondary battery in an over-discharged state.

An advantage of some aspects of the invention is to provide a mobile information processing device or an integrated circuit in which, when an over-discharged state of a secondary battery is detected, and the operation mode is transitioned from a normal operation mode to a power down mode, the power consumption of an over-discharge detection circuit can be reduced to zero. Also, another advantage of some aspects of the invention is to provide a function of cancelling the power down mode according to the power supply capability of a power feeding circuit, in such a mobile information processing device or integrated circuit. Also, another advantage of some aspects of the invention is to provide a battery pack and the like that includes such an integrated circuit along with a secondary battery.

SUMMARY

A mobile information processing device according to a first aspect of the invention includes: a power generator configured to generate electric power; a secondary battery configured to store electric power; a power feeding circuit configured to supply electric power generated by the power generator to the secondary battery; an electronic circuit to which electric power is supplied from the secondary battery; an over-discharge detection circuit that is supplied with electric power from the secondary battery, and is configured to detect whether or not the secondary battery is in an over-discharged state, and upon detecting that the secondary battery is in an over-discharged state over a predetermined period, stop a detection operation according to an enable signal; and a power down cancel circuit configured to, when the over-discharge detection circuit has stopped the detection operation, cause the over-discharge detection circuit to re-start the detection operation when a current supplied to a detection terminal from the power feeding circuit is a predetermined current or more.

An integrated circuit according to a second aspect of the invention includes: an over-discharge detection circuit that is supplied with electric power from a secondary battery, and is configured to detect whether or not the secondary battery is in an over-discharged state, and upon detecting that the secondary battery is in an over-discharged state over a predetermined period, stop a detection operation according to an enable signal; and a power down cancel circuit configured to, when the over-discharge detection circuit has stopped the detection operation, cause the over-discharge detection circuit to re-start the detection operation when a current supplied to a detection terminal from a power feeding circuit is a predetermined current or more.

According to the first or second aspect of the invention, when the secondary battery has been detected to be in an over-discharged state over a predetermined period, and the operation mode has transitioned from a normal operation mode to a power down mode, the over-discharge detection circuit stops the detection operation, and as a result, the power consumption of the over-discharge detection circuit can be reduced to zero. Also, when the current supplied to the detection terminal from the power feeding circuit is a predetermined current or more, the power down cancel circuit causes the over-discharge detection circuit to re-start the detection operation, and as a result, the power down mode can be cancelled according to the power supply capability of the power feeding circuit.

Here, the predetermined current is desirably greater than or equal to the consumption current of the over-discharge detection circuit. With this, even if the over-discharge detection circuit re-starts the detection operation, the power feeding circuit can supply electric power to the over-discharge detection circuit without consuming the electric power stored in the secondary battery.

Also, the power down cancel circuit includes a first resistor through which a current supplied to the detection terminal from the power feeding circuit flows when the secondary battery has been detected to be in an over-discharged state over the predetermined period, and when a voltage across the first resistor is a predetermined voltage or more, may activate a power down cancel signal, and cause the over-discharge detection circuit to re-start the detection operation. Accordingly, the power down cancel circuit can determine the power supply capability of the power feeding circuit based on the voltage obtained by converting the current supplied from the power feeding circuit, and activate the power down cancel signal based on the determination result.

In this case, the power down cancel circuit further includes a first transistor, a second resistor, and a second transistor that are connected in series between a positive electrode and a negative electrode of the secondary battery, the first transistor is turned on when the secondary battery has been detected to be in an over-discharged state over the predetermined period, and the second transistor may be turned on when a voltage across the first resistor is the predetermined voltage or more and activate the power down cancel signal. With this, the power consumption of the power down cancel circuit can be reduced to zero during the normal operation mode. Furthermore, during the normal operation mode, and in a period, during the power down mode, in which the current supplied from the power feeding circuit to the detection terminal is less than the predetermined current, the electric power supplied from the secondary battery to the power down cancel circuit can be reduced to zero.

Also, the integrated circuit may further include: an oscillator circuit configured to, when the power down cancel signal is activated, perform an oscillation operation and generate a clock signal, and when the power down cancel signal is deactivated, stop the oscillation operation; and a control circuit configured to, when the secondary battery has been detected to be in an over-discharged state over the predetermined period, deactivate the enable signal so as to cause the over-discharge detection circuit to stop the detection operation, and thereafter, when the power down cancel signal is activated, generate the enable signal in synchronization with the clock signal so as to cause the over-discharge detection circuit to operate intermittently. The oscillator circuit stops the oscillation operation during the power down mode, and therefore the power consumption of the oscillator circuit can be reduced to zero. Also, when the power down mode is cancelled, the over-discharge detection circuit operates intermittently, and as a result, the power consumption can be substantially reduced from that when the circuit operates continuously.

A battery pack according to a third aspect of the invention includes any of the integrated circuits described above and a secondary battery. According to the third aspect of the invention, a battery pack can be provided in which the consumption of the secondary battery is suppressed by reducing the power consumption of the over-discharge detection circuit to zero during the power down mode, and the power down mode can be cancelled according to the power supply capability of the power feeding circuit.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described in detail with reference to the drawings. The same constituent elements are given the same reference numerals, and a redundant description is omitted.

Configuration of Mobile Information Processing Device

Figure 1:
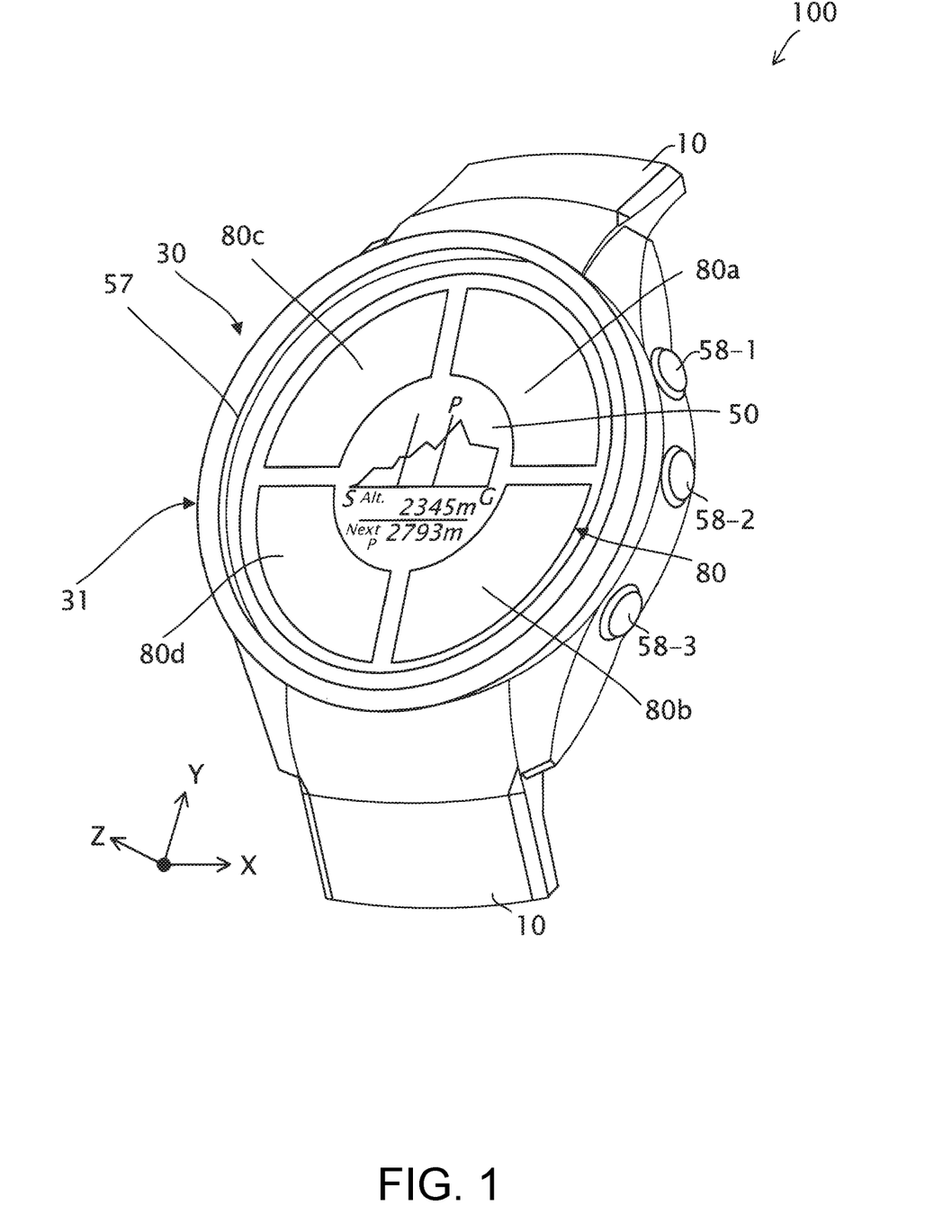
FIG. 1 is a perspective view illustrating an external view of a mobile information processing device on a front side according to embodiments of the invention.

FIG. 1 is a perspective view illustrating an external view of a mobile information processing device on a front side according to embodiments of the invention. The mobile information processing device is a wearable apparatus or the like that is to be attached to a user's body. In the following, a wrist apparatus such as a sport watch that has an external view similar to a wrist watch and is to be attached to a user's wrist will be described as an example. Note that shapes or the ratio of sizes of units in FIG. 1 and other drawings may be different from those of actual ones.

A mobile information processing device 100 includes a band 10 and a device body 30. The device body 30 includes a casing 31, a display 50, a bezel 57, buttons 58-1 to 58-3, and a solar cell 80. The solar cell 80 includes light receiving surfaces 80a to 80d on which light such as sunlight is incident.

As shown in FIG. 1, the direction from the center of the display surface of the display 50 toward the button 58-2 is defined as a positive direction of an X-axis, the direction from the center of the display surface of the display 50 toward the band 10 on the upper side in the diagram is defined as a positive direction of a Y-axis, and the direction separating from the device body 30 in the direction normal to the display surface of the display 50 is defined as a positive direction of a Z-axis.

The band 10 is attached to the device body 30, and is a member for attaching the device body 30 to a user. The casing 31 is a housing including an opening on a front side, and is made of metal such as stainless steel, or resin, for example. The display 50 is fitted into the opening of the casing 31, and displays an image. The bezel 57 is arranged so as to circularly surround the outer edge of the display 50, and is a member for protecting and reinforcing the display 50 and the casing 31.

When the buttons 58-1 to 58-3 are pressed down by the user, the mobile information processing device 100 is notified of various types of instructions. For example, when one of the buttons 58-1 to 58-3 is pressed down, the mobile information processing device 100 changes the image displayed in the display 50. The solar cell 80 functions as a power generator that generates electric power when supplied with energy of light such as sunlight.

Figure 2:
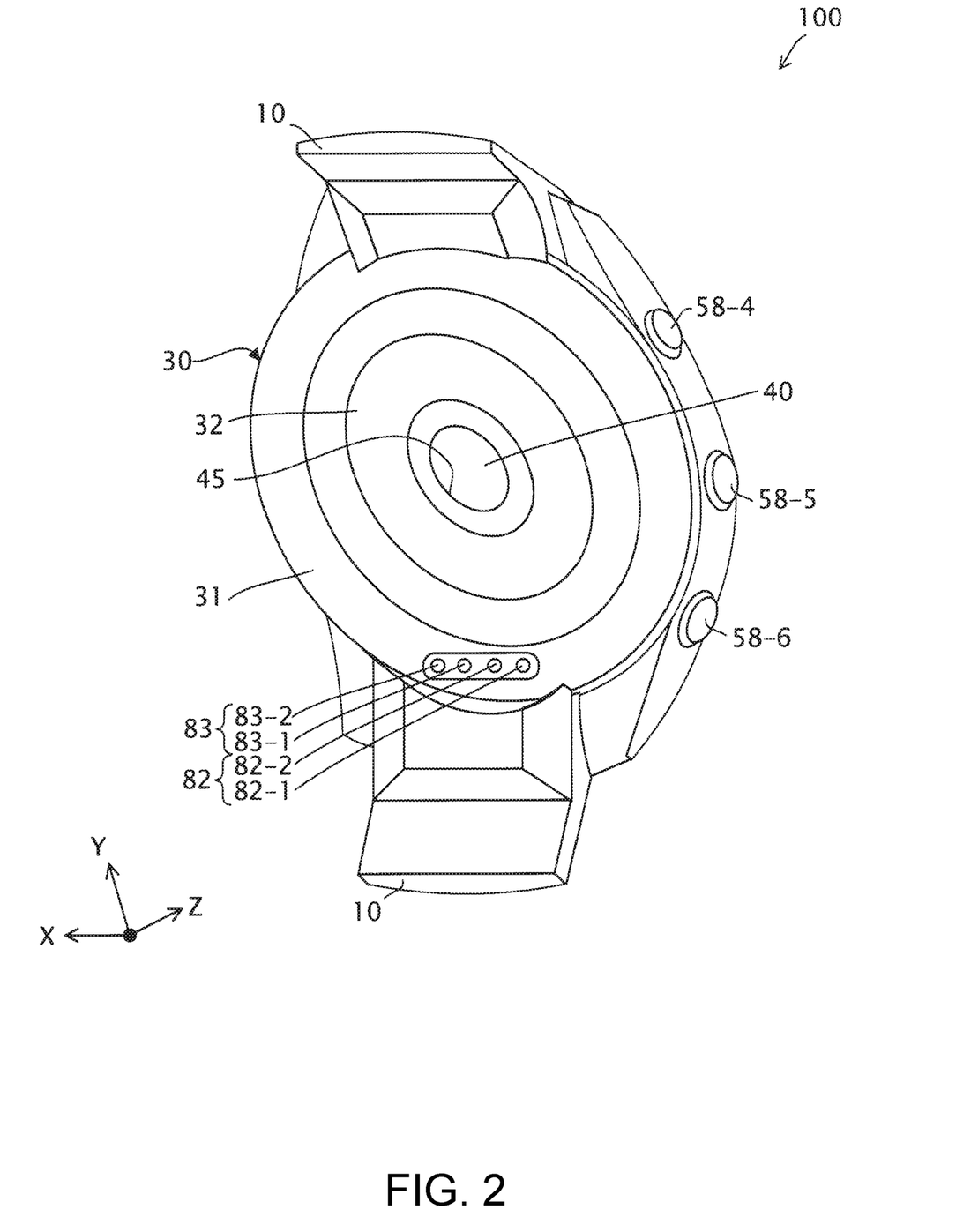
FIG. 2 is a perspective view illustrating an external view of the mobile information processing device shown in FIG. 1 on a back side.

FIG. 2 is a perspective view illustrating an external view of the mobile information processing device shown in FIG. 1 on a back side. As shown in FIG. 2, the device body 30 of the mobile information processing device 100 includes a photosensor 40, buttons 58-4 to 58-6, a communication terminal 82, and a charging terminal 83. Also, the casing 31 includes a protruding portion 32 and a measurement window 45 located at the apex of the protruding portion 32.

The photosensor 40 detects a pulse wave or the like using light. Therefore, the photosensor 40 includes a light receiver 41 and light emitters 42 (refer to FIG. 3), a bandpass filter, an AD (analog/digital) converter, and a circuit that drives the light receiver 41 and the light emitters 42 and detects a pulse or the like. The measurement window 45 is an opening for allowing light emitted from the light emitters 42 to pass through to the outside, and allowing light reflected by human tissue to pass through to the light receiver 41.

The light emitted from the light emitters 42 is reflected by human tissue such as a blood vessel, and is incident on the light receiver 41. The light receiver 41 generates a detection signal by photoelectrically converting the incident light. The bandpass filter restricts the frequency band of the detection signal. The AD converter converts an analog detection signal that is output from the bandpass filter to digital detection data, and outputs the detection data to a CPU (central processing unit) 21 (refer to FIG. 3).

Figure 3:
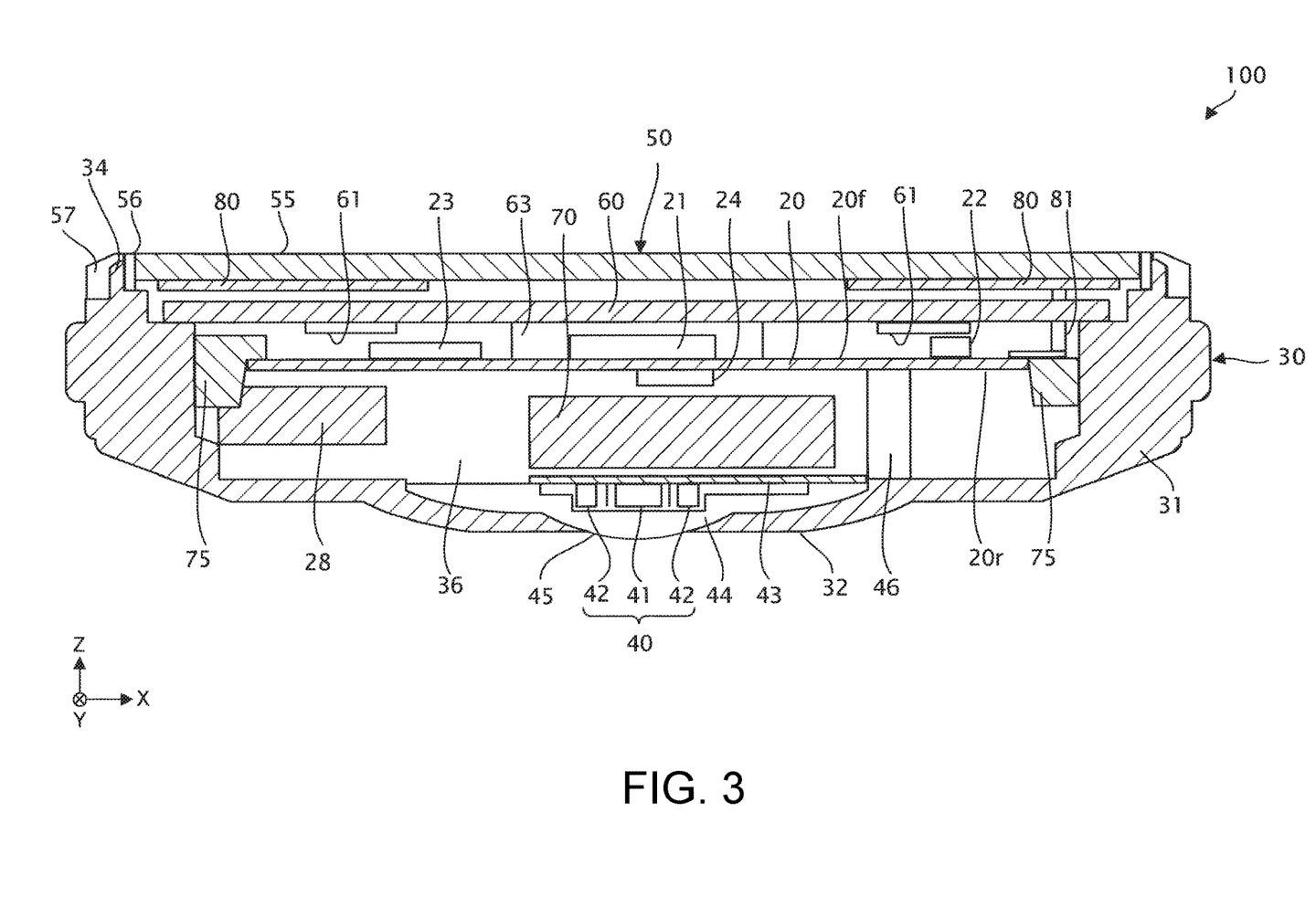
FIG. 3 is a cross-sectional view illustrating an internal structure of the mobile information processing device shown in FIGS. 1 and 2.

The amount of light absorbed by hemoglobin or the like included in blood that flows in a blood vessel of a living body changes in conjunction with heart beats, and therefore the amount of light incident on the light receiver 41 changes according to the propagation of heart beats, that is, pulses. The CPU 21 measures a pulse rate, a pulse interval (R-R interval), a heart rate variability (HRV), and the like of the user based on the detection data. Also, the CPU 21 can also measure blood pressure or a blood oxygenation level based on a similar principle by appropriately selecting the wavelength of light to be emitted from the light emitters 42. Note that the CPU 21 may be incorporated in a microcomputer along with peripheral circuits.

The communication terminal 82 is a terminal that comes into contact with a cradle for transmitting data when the mobile information processing device 100 communicates with the cradle, and includes a pair of communication terminals 82-1 and 82-2 that are electrically connected to a circuit substrate 20 (refer to FIG. 3) by conductive members such as coil springs. The charging terminal 83 is a terminal that comes into contact with the cradle for receiving supply of electric power when the mobile information processing device 100 is charged, and includes a pair of charging terminals 83-1 and 83-2 that are electrically connected to the circuit substrate 20 by conductive members such as coil springs. The cradle is an apparatus that performs charging of and data transfer with the mobile information processing device 100 without the mobile information processing device 100 being directly connected to a connector or the like conforming to the USB (universal serial bus) standard or the like.

FIG. 3 is a cross-sectional view illustrating the internal structure of the mobile information processing device shown in FIGS. 1 and 2. FIG. 3 shows a cross-section of the mobile information processing device 100 in an X-Z plane that passes through the center of the display surface of the display 50. As shown in FIG. 3, the device body 30 of the mobile information processing device 100 includes the circuit substrate 20, the CPU 21, an azimuth sensor 22, an acceleration sensor 23, a GPS (Global Positioning System) module 28, a sensor substrate 43, a transparent cover 44, an inter-substrate connector 46, a windshield plate 55, a joining member 56, an inter-substrate connector 63, a secondary battery 70, a substrate support 75, and an inter-substrate connector 81.

The casing 31 includes a protrusion 34 that protrudes in the positive direction of the Z-axis at an outer edge of the opening of the casing 31. Also, an internal space 36, which is a closed space surrounded by the casing 31 and the windshield plate 55, is provided inside of the casing 31. The display 50 includes a display panel 60, a circuit that drives the display panel 60, and an illuminator 61. The display panel 60 is constituted by an electro-optical panel such as a reflection type liquid crystal display panel or an EPD (electrophoretic display) panel.

The circuit substrate 20 includes a front surface 20f and a back surface 20r, and the circuit substrate 20 is attached, at end portions thereof, to the casing 31 by the substrate support 75. The CPU 21, the azimuth sensor 22, the acceleration sensor 23, and the like are mounted on the front surface 20f of the circuit substrate 20, and other circuit elements 24 are mounted on the back surface 20r.

The CPU 21 performs various types of control, computations, or data processing according to software stored in a nonvolatile memory or the like that is mounted on the circuit substrate 20. For example, the CPU 21 drives the azimuth sensor 22 or acceleration sensor 23 to measure body motion information, controls the GPS module 28 to measure the position, drives the photosensor 40 to measure a pulse wave or the like, and drives the display 50 to display an image.

The azimuth sensor 22 detects magnetism around the mobile information processing device 100, and specifies the azimuth based on the detected magnetism. The acceleration sensor 23 detects acceleration of the mobile information processing device 100 in three-axis directions that are orthogonal to each other. The GPS module 28 measures the position of the mobile information processing device 100 using satellite signals from GPS satellites, which are one type of position information satellite.

The light receiver 41 and the light emitters 42 of the photosensor 40 are mounted on the sensor substrate 43. In the example shown in FIG. 3, two light emitters 42 are arranged outside the light receiver 41. As a result of arranging the light receiver 41 between two light emitters 42 in this way, the light from outside that enters from an outer peripheral side of the casing 31 is suppressed from entering the light receiver 41, and the influence of the light from outside on the photosensor 40 can be reduced.

The transparent cover 44 is provided in the measurement window 45, and is a transparent member that allows light emitted from the light emitters 42 to pass through to the outside, allows light reflected by human tissue to pass through toward the light receiver 41, and suppresses foreign matter from entering the casing 31. For example, the transparent cover 44 is made of a photo-curing resin. As shown in FIG. 3, the transparent cover 44 protrudes from the apex of the protruding portion 32 of the casing 31. The inter-substrate connector 46 is constituted by a flexible substrate or the like, and electrically connects the sensor substrate 43 to the back surface 20r of the circuit substrate 20.

The windshield plate 55 is arranged so as to close the opening of the casing 31, and is attached to the inner edge of the protrusion 34 of the casing 31. The windshield plate 55 keeps foreign matter from entering the inside of the mobile information processing device 100 from the outside, and has a function of mitigating an impact applied to the mobile information processing device 100 from the outside. Glass, an acrylic resin, polycarbonate, or the like can be used as the material of the windshield plate 55.

The joining member 56 is a packing, an adhesive, or the like that is used to improve the airtightness and the liquid-tightness. The illuminator 61 is electrically connected to the front surface 20f of the circuit substrate 20, and functions as a backlight of the display panel 60. The inter-substrate connector 63 electrically connects the display panel 60 to the front surface 20f of the circuit substrate 20. The inter-substrate connector 81 electrically connects the solar cell 80 to the front surface 20f of the circuit substrate 20. The substrate support 75 is a member for supporting the circuit substrate 20.

First Embodiment

Figure 4:
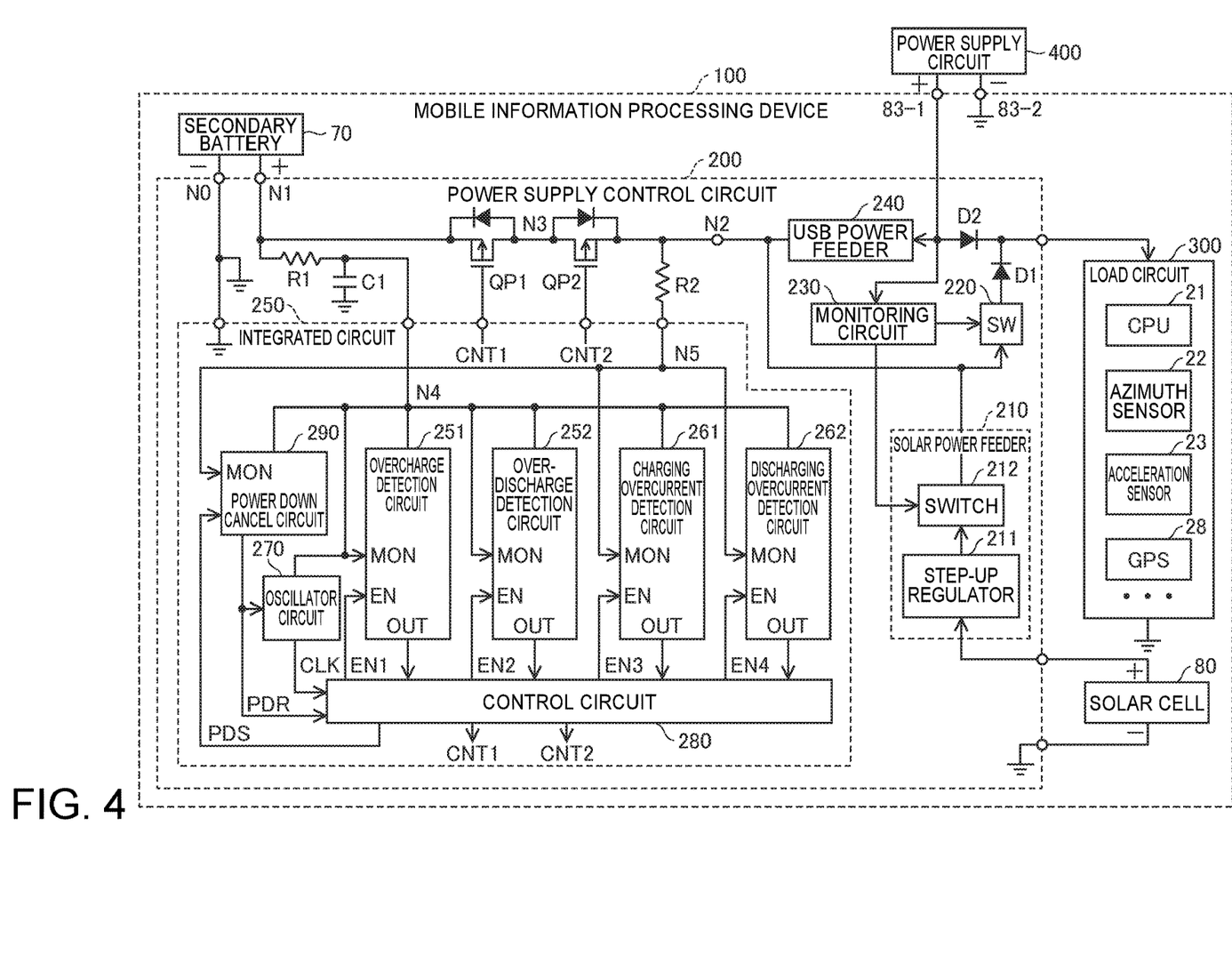
FIG. 4 is a circuit diagram illustrating an exemplary configuration of a mobile information processing device according to a first embodiment of the invention.

FIG. 4 is a circuit diagram illustrating an exemplary configuration of the mobile information processing device according to a first embodiment of the invention. As shown in FIG. 4, the mobile information processing device 100 includes the secondary battery 70, the solar cell 80, a power supply control circuit 200, and a load circuit 300. Note that some of the constituent elements shown in FIG. 4 may be omitted or changed, or another constituent element may be added to the constituent elements shown in FIG. 4.

Also, the mobile information processing device 100 can be connected to a power supply circuit 400, which is an external power supply provided in a cradle or the lie, via the pair of charging terminals 83-1 and 83-2. The power supply circuit 400 is connected to a connector or the like conforming to the USB standard or the like, and supplies a stabilized voltage of 5V.

The secondary battery 70 includes a positive electrode (+) connected to a first node N1, and a negative electrode (−) connected to a common potential node (power supply ground) NO, and stores electric power generated by the solar cell 80 or the power supply circuit 400. A chargeable battery such as a lithium-ion battery or a lithium polymer battery is used as the secondary battery 70, for example.

The power supply control circuit 200 includes a solar power feeder 210, a switch circuit (SW) 220, a monitoring circuit 230, a USB power feeder 240, an overcharge detection circuit 251, an over-discharge detection circuit 252, a charging overcurrent detection circuit 261, a discharging overcurrent detection circuit 262, an oscillator circuit 270, a control circuit 280, a power down cancel circuit 290, P-ch power MOS field effect transistors QP1 and QP2, diodes D1 and D2, resistors R1 and R2, and a capacitor C1.

Here, the overcharge detection circuit 251, the over-discharge detection circuit 252, the charging overcurrent detection circuit 261, the discharging overcurrent detection circuit 262, the oscillator circuit 270, the control circuit 280, the power down cancel circuit 290, the transistors QP1 and QP2, the resistors R1 and R2, and the capacitor C1 constitute a battery protection circuit that monitors the state of the secondary battery 70 and opens and closes the charging path and the discharging path in order to prevent the secondary battery 70 from being over-discharged or overcharged for protection. Also, the battery protection circuit constitutes a battery pack along with the secondary battery 70. Furthermore, at least some of the overcharge detection circuit 251, the over-discharge detection circuit 252, the charging overcurrent detection circuit 261, the discharging overcurrent detection circuit 262, the oscillator circuit 270, the control circuit 280, and the power down cancel circuit 290 may be incorporated in an integrated circuit (IC) 250, or the integrated circuit 250 may include another constituent element.

The solar power feeder 210 is a power feeding circuit that supplies the electric power generated by a power generator such as the solar cell 80 to the secondary battery 70 and the load circuit 300, and includes a step-up regulator 211 and a switch circuit 212. Because the output voltage of the solar cell 80 is too low to charge the secondary battery 70, the step-up regulator 211 steps-up and stabilizes the output voltage of the solar cell 80 to a voltage with which the secondary battery 70 can be charged.

The switch circuits 212 and 220 are each constituted by a transistor, for example. When the switch circuit 212 is turned on, the output voltage of the step-up regulator 211 is supplied to the switch circuit 220, and is also supplied to the secondary battery 70 via a second node N2 and transistors QP2 and QP1. When the switch circuit 220 is turned on, the output voltage of the solar power feeder 210 is supplied to the load circuit 300 via the diode D1 for backflow prevention.

For example, the step-up regulator 211 performs voltage conversion according to MPPT (maximum power point tracking), for example. Accordingly, the solar power feeder 210 supplies a voltage in a predetermined range to the secondary battery 70. Note that the current that the solar cell 80 can supply is determined by the amount of light incident on the solar cell 80, and therefore the current that the step-up regulator 211 can supply is also determined by the amount of light incident on the solar cell 80. Also, if the amount of light incident on the solar cell 80 is small, and the output voltage of the solar cell 80 is too low to be stepped up to a voltage with which the secondary battery 70 can be charged, the solar power feeder 210 stops operating.

If the voltage between the charging terminal 83-1 and the charging terminal 83-2 is higher than a threshold value, the monitoring circuit 230 determines that the power supply circuit 400 is connected to the mobile information processing device 100 and is supplying electric power, and performs control such that the switch circuits 212 and 220 are turned off. In this case, the voltage supplied from the power supply circuit 400 is supplied to the USB power feeder 240, and is also supplied to the load circuit 300 via the diode D2 for backflow prevention. In other cases, the monitoring circuit 230 performs control such that the switch circuits 212 and 220 are turned on.

The USB power feeder 240 is a power feeding circuit that supplies the electric power supplied from the external power supply circuit 400 to the secondary battery 70 and the load circuit 300, and supplies a current or a voltage for charging the secondary battery 70 to the secondary battery 70 via the second node N2 and the transistors QP2 and QP1. The USB power feeder 240 may limit the current supplied to the secondary battery 70 according to the voltage of the secondary battery 70.

In this way, the secondary battery 70 stores the electric power supplied from the solar power feeder 210 or the USB power feeder 240, and can supply the stored electric power to the load circuit 300 as needed. The load circuit 300 may include electronic circuits such as the CPU 21 that are supplied with electric power from the secondary battery 70, and the azimuth sensor 22, the acceleration sensor 23, the GPS module 28, the photosensor 40, and the display 50 that are controlled by the electronic circuits. Alternatively, the solar power feeder 210 or the power supply circuit 400 can supply electric power to the load circuit 300.

The transistors QP1 and QP2 are connected in series between the first node N1 and the second node N2. The transistor QP1 is used for controlling discharging and has a source and a drain that are respectively connected to the first node N1 and the third node N3, and a back gate connected to the first node N1. Note that, in this application, out of the two terminals of a transistor, that constitute a source and a drain, the one connected to the back gate is defined as the source. The transistor QP1 includes a parasitic diode whose anode and cathode are respectively connected to the third node N3 and the first node N1.

Also, the transistor QP2 is used to control charging, and has a source, a drain, and a back gate respectively connected to the second node N2, the third node N3, and the second node N2. The transistor QP2 includes a parasitic diode whose anode and cathode are respectively connected to the third node N3 and the second node N2. The transistors QP1 and QP2 are turned on, according to control signals CNT1 and CNT2 that are applied to respective gates, when the secondary battery 70 is charged and discharged.

Note that, instead of the P-ch power MOS field effect transistors QP1 and QP2, an N-ch power MOS field effect transistor may be used. In this case, two N-ch power MOS field effect transistors may be connected in series between a negative electrode (−) and a common potential node NO of the secondary battery 70. Also, bipolar transistors may be used instead of the power MOS field effect transistors.

The resistor R1 and the capacitor C1 are connected in series between the first node N1 and the common potential node NO. The resistor R1 and the capacitor C1 constitute a low-pass filter that smooths out a steep change in voltage, and the voltage at a connection point between the resistor R1 and the capacitor C1 is supplied to a fourth node N4. Also, the resistor R2 is connected between the second node N2 and the integrated circuit 250 in order to protect the integrated circuit 250 from electrostatic discharge, and the voltage at the second node N2 is supplied to a fifth node N5 via the resistor R2.

Integrated Circuit

In the example shown in FIG. 4, the integrated circuit 250 includes the overcharge detection circuit 251, the over-discharge detection circuit 252, the charging overcurrent detection circuit 261, the discharging overcurrent detection circuit 262, the oscillator circuit 270, the control circuit 280, and the power down cancel circuit 290. The integrated circuit 250 operates using, as the power supply voltage, the voltage supplied to the fourth node N4 from the secondary battery 70 via the first node N1 connected to one end (positive electrode) of the secondary battery 70, and the resistor R1.

The overcharge detection circuit 251 and the over-discharge detection circuit 252 each include a voltage dividing circuit that divides the voltage supplied to a detection terminal MON from the first node N1 via the resistor R1, and a comparator that compares a voltage obtained through voltage-division performed by the voltage dividing circuit with a reference voltage. Note that the resistance value of the resistor R1 is also an element used to determine the voltage dividing ratio of the voltage dividing circuit.

The overcharge detection circuit 251 operates when an enable signal EN1 is in an activated state, detects whether or not the secondary battery 70 is in an overcharged state, and outputs an output signal indicating the detection result from an output terminal OUT. For example, the overcharge detection circuit 251 detects the overcharged state when the voltage at the first node N1 is a predetermined voltage VA or higher, and activates an output signal. When the voltage at the first node N1 is lower than the predetermined voltage VA, the overcharge detection circuit 251 deactivates the output signal. Also, when the enable signal EN1 is in a deactivated state, the overcharge detection circuit 251 stops a detection operation, and the consumption current thereof is reduced to zero.

The over-discharge detection circuit 252 operates when an enable signal EN2 is in an activated state, detects whether or not the secondary battery 70 is in an over-discharged state, and outputs an output signal indicating the detection result from an output terminal OUT. For example, the over-discharge detection circuit 252 detects the over-discharged state when the voltage at the first node N1 is lower than a predetermined voltage VB, and activates an output signal. When the voltage at the first node N1 is the predetermined voltage VB or higher, the over-discharge detection circuit 252 deactivates the output signal (VA>VB). Also, when the enable signal EN2 is in a deactivated state, the over-discharge detection circuit 252 stops the detection operation, and the consumption current thereof is reduced to zero.

The second node N2 is connected to the solar power feeder 210 and the USB power feeder 240, and is also connected to the load circuit 300 via the switch circuit 220 and the diode D1. When the secondary battery 70 is charged by the solar power feeder 210 or the USB power feeder 240, a current flows from the second node N2 to the first node N1 via the transistors QP2 and QP1 having respective on-resistances.

Also, when electricity is discharged from the secondary battery 70 to the load circuit 300, a current flows from the first node N1 to the second node N2 via the transistors QP1 and QP2 having the respective on-resistances. Accordingly, if the on-resistances of the transistors QP1 and QP2 are known, the current flowing between the first node N1 and the second node N2 can be detected based on the difference between potentials at the first node N1 and the second node N2.

The charging overcurrent detection circuit 261 and the discharging overcurrent detection circuit 262 each include a first voltage dividing circuit that divides the voltage supplied to a power supply terminal from the first node N1 via the resistor R1, a second voltage dividing circuit that divides the voltage supplied to a detection terminal MON from the second node N2 via the resistor R2, and a comparator that compares the difference between the voltage obtained by voltage-division performed by the first voltage dividing circuit and the voltage obtained by voltage-division performed by the second voltage dividing circuit with a reference voltage. Note that the resistance value of the resistor R1 is also an element used to determine the voltage dividing ratio of the first voltage dividing circuit. Also, the resistance value of the resistor R2 is also an element used to determine the voltage dividing ratio of the second voltage dividing circuit.

The charging overcurrent detection circuit 261 operates when an enable signal EN3 is in an activated state, detects whether or not a charging overcurrent is flowing to the secondary battery 70, and outputs an output signal indicating the detection result from an output terminal OUT. For example, the charging overcurrent detection circuit 261 detects the charging overcurrent when the current flowing from the second node N2 to the first node N1 is larger than a predetermined current IA, and activates the output signal. When the current flowing from the second node N2 to the first node N1 is smaller than the predetermined current IA, the charging overcurrent detection circuit 261 deactivates the output signal. Also, the charging overcurrent detection circuit 261 stops the detection operation when the enable signal EN3 is in a deactivated state, and the consumption current thereof is reduced to zero.

The discharging overcurrent detection circuit 262 operates when an enable signal EN4 is in an activated state, detects whether or not a discharging overcurrent is flowing from the secondary battery 70, and outputs an output signal indicating the detection result from an output terminal OUT. For example, the discharging overcurrent detection circuit 262 detects the discharging overcurrent when the current flowing from the first node N1 to the second node N2 is larger than a predetermined current IB, and activates the output signal. When the current flowing from the first node N1 to the second node N2 is smaller than the predetermined current IB, the discharging overcurrent detection circuit 262 deactivates the output signal. Also, the discharging overcurrent detection circuit 262 stops the detection operation when the enable signal EN4 is in a deactivated state, and the consumption current thereof is reduced to zero.

In the following, a case where the overcharge detection circuit 251, the over-discharge detection circuit 252, the charging overcurrent detection circuit 261, and the discharging overcurrent detection circuit 262 are operated intermittently will be described, as an example. The oscillator circuit 270 is constituted by a CR oscillator circuit, for example, performs an oscillation operation when a power down cancel signal PDR supplied from the power down cancel circuit 290 is activated, and generates a clock signal CLK having a predetermined frequency. When the power down cancel signal PDR is deactivated, the oscillator circuit 270 stops the oscillation operation.

The control circuit 280 is constituted by a logic circuit including a combinational circuit or a sequential circuit, for example, generates, during a normal operation mode, the enable signals EN1 to EN4 in synchronization with the clock signal CLK supplied from the oscillator circuit 270, and supplies the enable signals EN1 to EN4 respectively to the overcharge detection circuit 251, the over-discharge detection circuit 252, the charging overcurrent detection circuit 261, and the discharging overcurrent detection circuit 262, while deactivating a power down set signal PDS.

The enable signals EN1 to EN4 repeat an activated state and a deactivated state at respective intermittent periods, and as a result, the overcharge detection circuit 251, the over-discharge detection circuit 252, the charging overcurrent detection circuit 261, and the discharging overcurrent detection circuit 262 operate intermittently according to the respective enable signals EN1 to EN4. As a result of the overcharge detection circuit 251, the over-discharge detection circuit 252, the charging overcurrent detection circuit 261, and the discharging overcurrent detection circuit 262 operating intermittently, the power consumption can be substantially reduced from that when operating continuously. Note that, when any of the overcharge detection circuit 251, the over-discharge detection circuit 252, the charging overcurrent detection circuit 261, and the discharging overcurrent detection circuit 262 is operated continuously, the control circuit 280 activates the corresponding one of enable signals EN1 to EN4 continuously, during the normal operation mode.

Also, the control circuit 280 fetches the output signal of the overcharge detection circuit 251 in a portion of the period in which the overcharge detection circuit 251 performs the detection operation, after the enable signal EN1 has been activated and the output signal of the comparator of the overcharge detection circuit 251 has stabilized. The same applies to the over-discharge detection circuit 252, the charging overcurrent detection circuit 261, and the discharging overcurrent detection circuit 262. Furthermore, the control circuit 280 generates the control signals CNT1 and CNT2 to respectively control the transistors QP1 and QP2 based on the output signals from the overcharge detection circuit 251, the over-discharge detection circuit 252, the charging overcurrent detection circuit 261, and the discharging overcurrent detection circuit 262.

When the overcharge detection circuit 251 has detected the overcharged state over a predetermined period, or the charging overcurrent detection circuit 261 has detected the charging overcurrent over a predetermined period, the control circuit 280 turns off the transistor QP2, and stops charging of the secondary battery 70. Note that the secondary battery 70 can supply a current to the load circuit 300 via the parasitic diode of the transistor QP2.

When the over-discharge detection circuit 252 has detected the over-discharged state over a predetermined period, or the charging overcurrent detection circuit 261 has detected the charging overcurrent over a predetermined period, the control circuit 280 turns off the transistor QP1, and stops supply of a current from the secondary battery 70 to the load circuit 300. Note that the secondary battery 70 can be charged via the parasitic diode of the transistor QP1.

In the following, a case where the power supply circuit 400 is not connected to the mobile information processing device 100 will be described. If the power supply capability of the solar power feeder 210 is reduced and the secondary battery 70 has been detected to be in an over-discharged state over a predetermined period, the control circuit 280 causes the operation mode to transition from the normal operation mode to the power down mode. During the power down mode, the control circuit 280 deactivates the enable signals EN1 to EN4, stops the detection operation in the overcharge detection circuit 251, the over-discharge detection circuit 252, the charging overcurrent detection circuit 261, and the discharging overcurrent detection circuit 262, while activating the power down set signal PDS. The power down set signal PDS is supplied to the power down cancel circuit 290.

The power down cancel circuit 290, during the power down mode in which the power down set signal PDS is activated, deactivates the power down cancel signal PDR when the current that is supplied from the solar power feeder 210 to the detection terminal MON via the resistor R2 is smaller than a predetermined current. The power down cancel signal PDR is supplied to the oscillator circuit 270 and the control circuit 280. As a result of the power down cancel signal PDR in a deactivated state being supplied to the oscillator circuit 270, the oscillator circuit 270 stops performing the oscillation operation.

On the other hand, when the current supplied from the solar power feeder 210 to the detection terminal MON via the resistor R2 is the predetermined current or more, during the power down mode, the power down cancel circuit 290 activates the power down cancel signal PDR. Accordingly, the oscillator circuit 270 re-starts the oscillation operation, and generates the clock signal CLK.

Also, the control circuit 280 cancels the power down mode, re-starts generation of at least the enable signal EN2 so as to cause the over-discharge detection circuit 252 to re-start the detection operation, and deactivates the power down set signal PDS. Alternatively, even if the power down cancel signal PDR is not supplied, the control circuit 280 may cancel the power down mode upon detecting the clock signal CLK. While the power down set signal PDS is deactivated, the power down cancel circuit 290 keeps the power down cancel signal PDR in an activated state.

Note that the control circuit 280 may cause the overcharge detection circuit 251, the charging overcurrent detection circuit 261, and the discharging overcurrent detection circuit 262 to re-start the detection operation when a predetermined period has elapsed, and the voltage of the secondary battery 70 or the power supply capability of the solar power feeder 210 has further increased. In this case, the control circuit 280 causes the operation mode to transition from the power down mode to the normal operation mode via a partial operation mode.

Battery Pack

Figure 5:
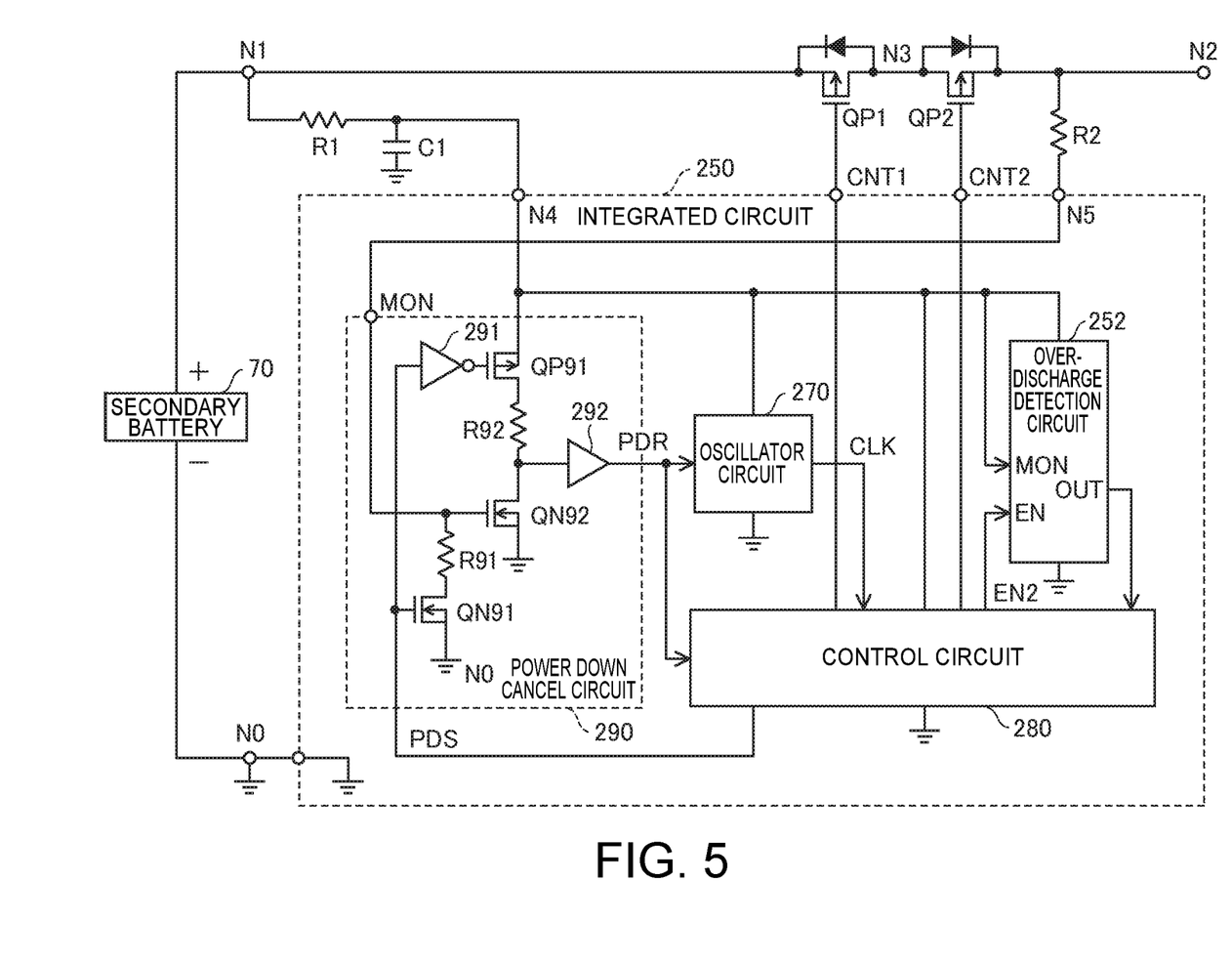
FIG. 5 is a circuit diagram illustrating an exemplary configuration of a battery pack according to the first embodiment of the invention.

FIG. 5 is a circuit diagram illustrating an exemplary configuration of a battery pack according to the first embodiment of the invention. As shown in FIG. 5, the battery pack includes the secondary battery 70, the integrated circuit 250, transistors QP1 and QP2, the resistors R1 and R2, and the capacitor C1. The integrated circuit 250 includes the over-discharge detection circuit 252, the oscillator circuit 270, the control circuit 280, and the power down cancel circuit 290. Note that, in FIG. 5, the overcharge detection circuit 251, the charging overcurrent detection circuit 261, and the discharging overcurrent detection circuit 262 shown in FIG. 4 are omitted.

Power Down Cancel Circuit

As shown in FIG. 5, the power down cancel circuit 290 includes an inverter 291, a buffer circuit 292, a P-ch MOS field effect transistor QP91, N-ch MOS field effect transistors QN91 and QN92, a first resistor R91, and a second resistor R92.

The first resistor R91 and the transistor QN91 are connected in series between the detection terminal MON and the common potential node NO. The transistor QN91 has a drain connected to the detection terminal MON via the first resistor R91, a source connected to the common potential node NO, and a gate to which the power down set signal PDS is supplied from the control circuit 280.

The transistor QP91, the second resistor R92, and the transistor QN92 are connected in series between the positive electrode and the negative electrode of the secondary battery 70 via the resistor R1. The transistor QP91 (first transistor) has a source connected to the fourth node N4, a drain connected to one end of the second resistor R92, and a gate connected to an output terminal of the inverter 291. The power down set signal PDS is supplied to an input terminal of the inverter 291 from the control circuit 280.

The transistor QN92 (second transistor) has a drain connected to the other end of the second resistor R92, a source connected to the common potential node NO, and a gate connected to the detection terminal MON. The input terminal of the buffer circuit 292 is connected to the drain of the transistor QN92, and the power down cancel signal PDR is output from an output terminal of the buffer circuit 292.

During the normal operation mode, the control circuit 280 deactivates the power down set signal PDS to a low level. Accordingly, the transistor QN91 is turned off, and a current does not flow through the first resistor R91. Also, the inverter 291 inverts the power down set signal PDS, and supplies an output signal at a high level to the gate of the transistor QP91, and therefore the transistor QP91 is turned off.

Accordingly, the input signal supplied to the buffer circuit 292 is kept at a low level, and the buffer circuit 292 activates the power down cancel signal PDR to a low level. With this, the oscillator circuit 270 performs the oscillation operation to generate the clock signal CLK, and the control circuit 280 generates the enable signal EN2 in synchronization with the clock signal CLK. The over-discharge detection circuit 252 performs the detection operation when the enable signal EN2 is activated.

When the secondary battery 70 has been detected to be in an over-discharged state over a predetermined period, the control circuit 280 causes the operation mode to transition from the normal operation mode to the power down mode, and deactivates the enable signal EN2, and as a result, the over-discharge detection circuit 252 stops the detection operation. With this, the power consumption of the over-discharge detection circuit 252 and the control circuit 280 can be reduced to zero.

Also, the control circuit 280 activates the power down set signal PDS to a high level. With this, the transistor QN91 is turned on, and the current supplied from the solar power feeder 210 to the detection terminal MON flows through the first resistor R91, and as a result, a voltage is generated across the first resistor R91. Also, the inverter 291 inverts the power down set signal PDS, and supplies an output signal at a low level to the gate of the transistor QP91, and as a result, the transistor QP91 is turned on.

When the power supply capability of the solar power feeder 210 is low, and the current supplied from the solar power feeder 210 to the detection terminal MON is less than a predetermined current, the voltage across the first resistor R91 is lower than a predetermined voltage (threshold voltage of the transistor QN92), and the transistor QN92 is turned off, and as a result, the power down cancel signal PDR is deactivated to a high level.

With this, because the oscillator circuit 270 stops the oscillation operation, the power consumption of the oscillator circuit 270 can be reduced to zero. Also, in the power down cancel circuit 290, a current does not flow through the transistor QN92, and the inverter 291 and the buffer circuit 292 do not consume power in a steady state. Accordingly, the electric power supplied from the secondary battery 70 to the integrated circuit 250 can be reduced to zero.

Thereafter, when the power supply capability of the solar power feeder 210 increases, and the current supplied from the solar power feeder 210 to the detection terminal MON increases to the predetermined current or more, the voltage across the first resistor R91 increases to the predetermined voltage or more, and the transistor QN92 is turned on so as to deactivate the power down cancel signal PDR to a low level.

The power down cancel signal PDR is supplied to the oscillator circuit 270 and the control circuit 280 from the buffer circuit 292. With this, the oscillator circuit 270 re-starts the oscillation operation, and the control circuit 280 restarts generation of the enable signal EN, and deactivates the power down set signal PDS to a low level.

In this way, when the voltage across the first resistor R91 through which the current supplied from the solar power feeder 210 to the detection terminal MON flows is the predetermined voltage or more, during the power down mode, the power down cancel circuit 290 activates the power down cancel signal PDR so as to cause the over-discharge detection circuit 252 to re-start the detection operation. Accordingly, the power down cancel circuit 290 can determine the power supply capability of the solar power feeder 210 based on the voltage obtained by converting the current supplied from the solar power feeder 210, and activate the power down cancel signal PDR based on the determination result.

Also, the power consumption of the power down cancel circuit 290 shown in FIG. 5 can be reduced to zero during the normal operation mode. Furthermore, during the normal operation mode, and in a period, during the power down mode, in which the current supplied from the solar power feeder 210 to the detection terminal MON is less than the predetermined current, the electric power supplied from the secondary battery 70 to the power down cancel circuit 290 can be reduced to zero.

Here, the predetermined current with which the transistor QN92 is turned on is desirably at least a consumption current of the over-discharge detection circuit 252 or more. With this, even if the over-discharge detection circuit 252 re-starts the detection operation, the solar power feeder 210 can supply electric power to the over-discharge detection circuit 252 without consuming the electric power stored in the secondary battery 70.

For example, in the case where the consumption current of the over-discharge detection circuit 252 when performing the detection operation is 1 μA, and the consumption current of the load circuit 300 (FIG. 4) is approximately zero, if the threshold voltage of the transistor QN92 is 1.1 V, the resistance value of the first resistor R91 may be set to approximately 1.1 MΩ. In this case, when the current supplied from the solar power feeder 210 to the first resistor R91 is 1 μA, the voltage across the first resistor R91 is 1.1 V, the transistor QN92 is turned on, and the power down cancel signal PDR is activated.

Also, when the over-discharge detection circuit 252 operates intermittently, the predetermined current is desirably greater than or equal to the sum of consumption currents of at least the over-discharge detection circuit 252, the oscillator circuit 270, and the control circuit 280. For example, when the average consumption current of the over-discharge detection circuit 252 when operating intermittently is 100 nA, and the consumption current of the oscillator circuit 270 and the control circuit 280 is 100 nA, if the threshold voltage of the transistor QN92 is 1.1 V, the resistance value of the first resistor R91 may be set to approximately 5.5 MΩ. In this case, when the current supplied from the solar power feeder 210 to the first resistor R91 is 200 nA, the voltage across the first resistor R91 is 1.1 V, the transistor QN92 is turned on, and the power down cancel signal PDR is activated.

If the current supplied from the solar power feeder 210 to the battery pack further increases, the current exceeding the consumption current of the over-discharge detection circuit 252 and the like is used to charge the secondary battery 70. For example, when the current supplied from the solar power feeder 210 to the battery pack is 3 μA, and the consumption current of the over-discharge detection circuit 252 and the like is 200 nA, the remaining current of 2.8 μA is used to charge the secondary battery 70.

Alternatively, in order for the power down cancel signal PDR to be not activated unless the brightness around the solar cell 80 has substantially increased, the resistance value of the first resistor R91 may be set to a value that is smaller than the above-described resistance value. For example, in the case where the resistance value of the first resistor R91 is set to 1.52 MΩ, when the current supplied from the solar power feeder 210 to the first resistor R91 is approximately 0.72 μA, the voltage across the first resistor R91 is 1.1 V, the transistor QN92 is turned on, and the power down cancel signal PDR is activated.

Similarly, in the case where the resistance value of the first resistor R91 is set to 640 kΩ, when the current supplied from the solar power feeder 210 to the first resistor R91 is approximately 1.72 μA, the voltage across the first resistor R91 is 1.1 V, and the power down cancel signal PDR is activated. Also, in the case where the resistance value of the first resistor R91 is set to 80 kΩ, when the current supplied from the solar power feeder 210 to the first resistor R91 is approximately 13.8 μA, the voltage across the first resistor R91 is 1.1 V, and the power down cancel signal PDR is activated.

Furthermore, at least one transistor, diode, or the like may be connected between the source of the transistor QN92 and the common potential node NO in order to adjust the gate voltage at which the transistor QN92 is turned on. Note that, in the case where the overcharge detection circuit 251, the charging overcurrent detection circuit 261, or the discharging overcurrent detection circuit 262 shown in FIG. 4 is also caused to re-start the detection operation at the same time as when the over-discharge detection circuit 252 is caused to re-start the detection operation, the predetermined current needs to be determined by adding the consumption current of the overcharge detection circuit 251, the charging overcurrent detection circuit 261, or the discharging overcurrent detection circuit 262 to the consumption current of the over-discharge detection circuit 252.

In any case, because the resistance value of the first resistor R91 exerts a great influence on the operation of the power down cancel circuit 290, a configuration may be adopted in which the resistance value of the first resistor R91 can be adjusted when the integrated circuit 250 is manufactured. For example, a configuration may be employed in which a plurality of series circuits in each of which a resistor and a fuse are connected in series are parallelly connected, the resistance values of the resistors being different to each other, or a plurality of parallel circuits in each of which a resistor and a fuse are parallelly connected are connected in series between the detection terminal MON and the drain of the transistor QN91, and some of the fuses may be cut so as to obtain an appropriate resistance value, using a laser device.

Alternatively, a configuration may be adopted in which the resistance value of the first resistor R91 can be adjusted after the integrated circuit 250 has been shipped from a factory. For example, a plurality of series circuits in each of which a resistor and a switch circuit are connected in series are parallelly connected, the resistance values of the resistors being different to each other, or a plurality of parallel circuits in each of which a resistor and a switch circuit are parallelly connected are connected in series between the detection terminal MON and the drain of the transistor QN91, and the switch circuits may be controlled so as to obtain an appropriate resistance value. In this case, a configuration may be adopted in which control information regarding the control of the switch circuits is written into a nonvolatile memory of the integrated circuit 250 from the outside, and the control circuit 280 reads out the control information from the nonvolatile memory and controls the switch circuits.

As described above, according to the present embodiment, in the case where the secondary battery 70 has been detected to be in an over-discharged state over a predetermined period, and the operation mode has transitioned from the normal operation mode to the power down mode, the over-discharge detection circuit 252 stops the detection operation, and as a result, the power consumption of the over-discharge detection circuit 252 can be reduced to zero. Also, the power down cancel circuit 290 re-starts the detection operation of the over-discharge detection circuit 252 when the current supplied from the solar power feeder 210 to the detection terminal MON is the predetermined current or more, and as a result, the power down mode can be cancelled according to the power supply capability of the solar power feeder 210. Furthermore, a battery pack can be provided in which the consumption of the secondary battery is suppressed by reducing the power consumption of the over-discharge detection circuit 252 to zero during the power down mode, and the power down mode can be cancelled according to the power supply capability of the solar power feeder 210.

First Modification of Power Down Cancel Circuit

Figure 6:
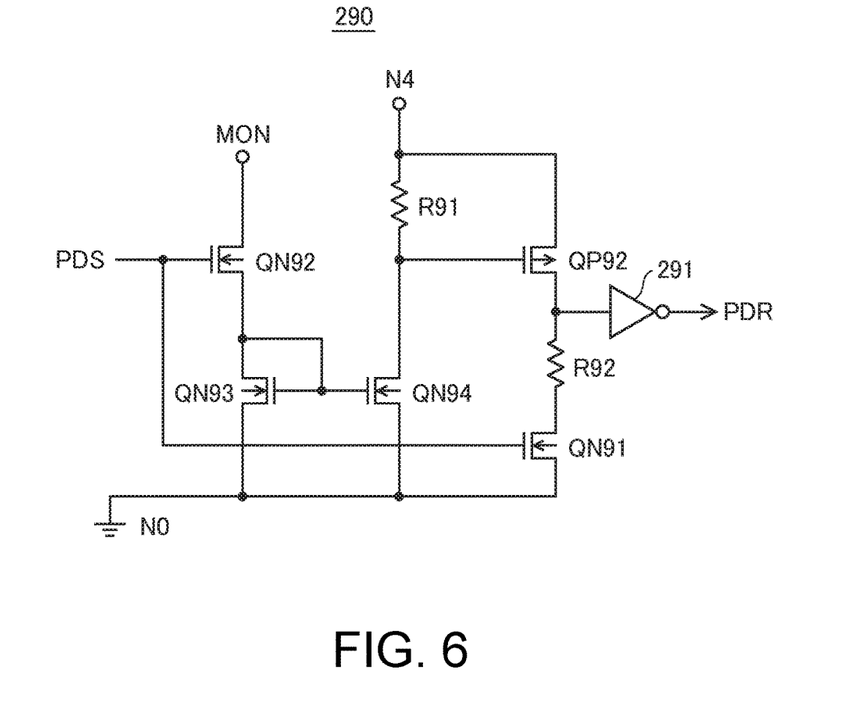
FIG. 6 is a circuit diagram illustrating a first modification of a power down cancel circuit.

FIG. 6 is a circuit diagram illustrating a first modification of the power down cancel circuit. As shown in FIG. 6, the power down cancel circuit 290 includes an inverter 291, a P-ch MOS field effect transistor QP92, N-ch MOS field effect transistors QN91 to QN94, a first resistor R91, and a second resistor R92.

The transistor QN92 has a drain connected to the detection terminal MON and a gate to which the power down set signal PDS is supplied from the control circuit 280 (FIG. 5). The transistor QN93 has a drain and a gate that are connected to a source of the transistor QN92, and a source connected to the common potential node NO.

The transistor QN94 has a drain connected to a fourth node N4 via the first resistor R91, a gate connected to the drain and gate of the transistor QN93, and a source connected to the common potential node NO. The transistors QN93 and QN94 constitute a current mirror circuit that adjusts the current flowing through the first resistor R91 to a current proportional to the current supplied to the detection terminal MON from the solar power feeder 210 (FIG. 4).

The transistor QP92, the second resistor R92, and the transistor QN91 are connected in series between the positive electrode and the negative electrode of the secondary battery 70 via the resistor R1 (FIG. 5). The transistor QN91 (first transistor) has a drain connected to one end of the second resistor R92, a source connected to the common potential node NO, and a gate to which the power down set signal PDS is supplied from the control circuit 280.

The transistor QP92 (second transistor) has a source connected to the fourth node N4, a drain connected to the other end of the second resistor R92, and a gate connected to the fourth node N4 via the first resistor R91. An input terminal of the inverter 291 is connected to the drain of the transistor QP92, and the power down cancel signal PDR is output from an output terminal of the inverter 291.

During the normal operation mode, the control circuit 280 deactivates the power down set signal PDS to a low level. With this, the transistors QN91 and QN92 are in an off state. Accordingly, the input signal to the inverter 291 is kept at a high level, and the inverter 291 activates the power down cancel signal PDR to a low level.

When the secondary battery 70 has been detected to be in an over-discharged state over a predetermined period, the control circuit 280 causes the operation mode to transition from the normal operation mode to the power down mode, deactivates the enable signal EN2, and activates the power down set signal PDS to a high level. Accordingly, the transistors QN91 and QN92 are turned on, the current supplied from the solar power feeder 210 to the detection terminal MON flows through the transistor QN93, and a current proportional to the current flowing through the transistor QN93 flows through the transistor QN94. With this, the current flows through the first resistor R91, and a voltage is generated across the first resistor R91.

When the power supply capability of the solar power feeder 210 is small, and the current supplied to the detection terminal MON from the solar power feeder 210 is smaller than the predetermined current, the voltage across the first resistor R91 is lower than a predetermined voltage (threshold voltage of the transistor QP92), and the transistor QP92 is turned off. Therefore, because the input signal of the inverter 291 falls to a low level, the inverter 291 deactivates the power down cancel signal PDR to a high level.

Thereafter, when the power supply capability of the solar power feeder 210 has increased, and the current supplied to the detection terminal MON from the solar power feeder 210 has increased to the predetermined current or more, the voltage across the first resistor R91 increases to the predetermined voltage or more, and the transistor QP92 is turned on. Therefore, because the input signal of the inverter 291 rises to a high level, the inverter 291 activates the power down cancel signal PDR to a low level.

In this way, when the voltage across the first resistor R91 to which a current amplified by the current mirror circuit is supplied has increased to the predetermined voltage or more, during the power down mode, the power down cancel circuit 290 activates the power down cancel signal PDR, and causes the over-discharge detection circuit 252 (FIG. 5) to re-start the detection operation.

Second Modification of Power Down Cancel Circuit

Figure 7:
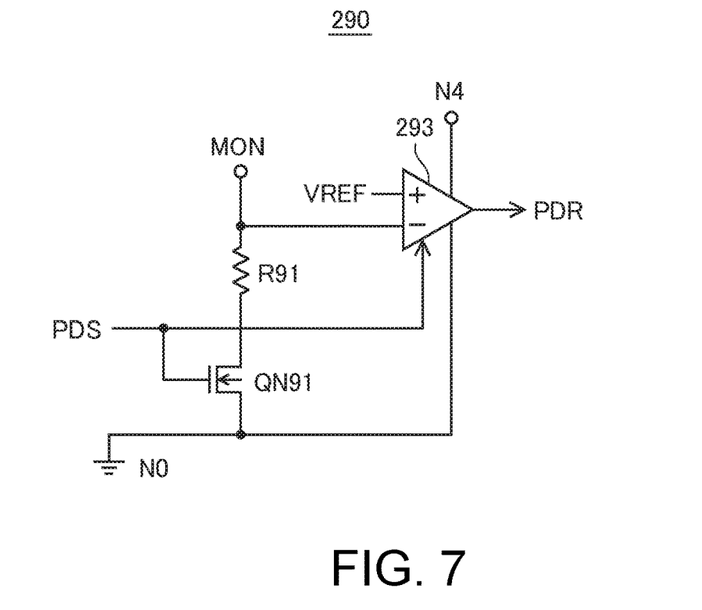
FIG. 7 is a circuit diagram illustrating a second modification of the power down cancel circuit.

FIG. 7 is a circuit diagram illustrating a second modification of the power down cancel circuit. As shown in FIG. 7, the power down cancel circuit 290 includes a comparator 293, an N-ch MOS field effect transistor QN91, and a first resistor R91.

The first resistor R91 and the transistor QN91 are connected in series between the detection terminal MON and the common potential node NO. The transistor QN91 has a drain connected to the detection terminal MON via the first resistor R91, a source connected to the common potential node NO, and a gate to which the power down set signal PDS is supplied from the control circuit 280 (FIG. 5).

When the power down set signal PDS is activated, the comparator 293 compares the voltage at the detection terminal MON with a predetermined voltage (reference voltage VREF), and outputs a signal representing the comparison result as the power down cancel signal PDR. On the other hand, when the power down set signal PDS is deactivated, the comparator 293 activates the power down cancel signal PDR to a low level.

During the normal operation mode, the control circuit 280 deactivates the power down set signal PDS to a low level. Therefore, the transistor QN91 is turned off, and a current does not flow through the first resistor R91. Also, the comparator 293 activates the power down cancel signal PDR to a low level.

When the secondary battery 70 has been detected to be in an over-discharged state over a predetermined period, the control circuit 280 causes the operation mode to transition from the normal operation mode to the power down mode, and activates the power down set signal PDS to a high level. Accordingly, the transistor QN91 is turned on, and thus the current supplied to the detection terminal MON from the solar power feeder 210 flows through the first resistor R91, and a voltage is generated across the first resistor R91.

When the power supply capability of the solar power feeder 210 is small, and the current supplied to the detection terminal MON from the solar power feeder 210 is smaller than the predetermined current, the voltage across the first resistor R91 is lower than the reference voltage VREF, and the comparator 293 deactivates the power down cancel signal PDR to a high level.

Thereafter, when the power supply capability of the solar power feeder 210 has increased, and the current supplied to the detection terminal MON from the solar power feeder 210 has increased to the predetermined current or more, the voltage across the first resistor R91 increases to the reference voltage VREF or more, and the comparator 293 activates the power down cancel signal PDR to a low level.

In the example shown in FIG. 7, the reference voltage VREF is used as the predetermined voltage, but a configuration may be adopted in which a plurality of resistors are connected in series between a node of the reference voltage VREF and the common potential node NO so as to constitute a voltage dividing circuit, and the predetermined voltage can be selected using a selection circuit that is connected to the connection nodes of the resistors.

Second Embodiment

In a second embodiment, the solar power feeder 210 shown in FIG. 4 functions as a power feeding circuit that transforms or stabilizes the voltage supplied from a power generator other than the solar cell 80. In other respects, the second embodiment may be similar to the first embodiment. A vibration power generator, a temperature difference power generator, or the like can be used as the power generator in the second embodiment.

The vibration power generator includes a power generator of an electromagnetic induction type, piezoelectric type, electrostatic type, or the like. A rotary power generator that is used in a wrist apparatus such as a sport watch comes under the category of an electromagnetic induction type power generator, for example. In a rotary power generator, a built-in rotating weight is rotated due to motion of a user's arm and the rotating speed of the weight is accelerated by gears, which causes a power generation rotor to rotate at an extremely high speed. A capacitor is charged by the generated electric power.

A piezoelectric type power generator uses the electromotive force generated when a piezoelectric material such as a piezoelectric element deforms due to vibration, as electric power. Also, an electrostatic type power generator uses a structure in which two planar electrodes oppose each other, and uses the electromotive force generated when the positional relationship between the two electrodes changes due to vibration as electric power.

Figure 8:
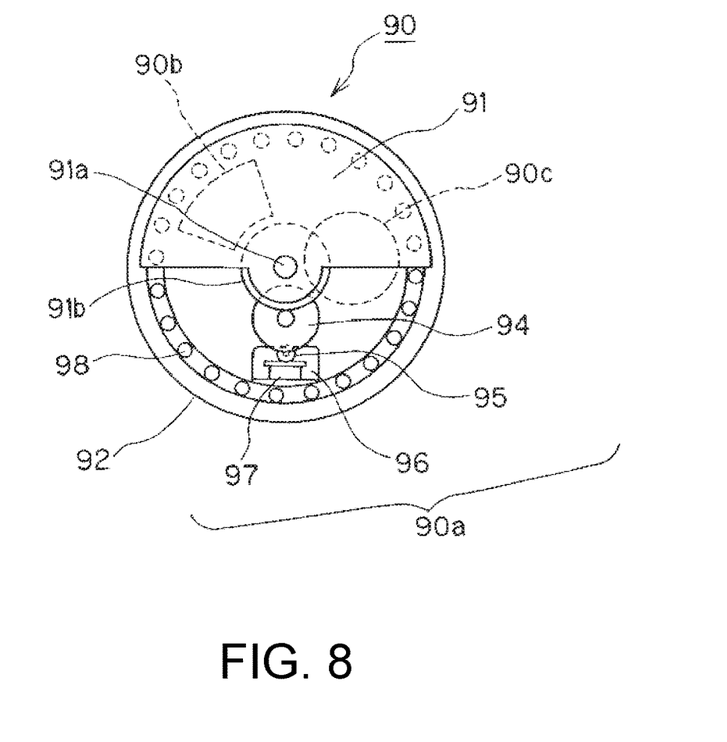
FIG. 8 is a plan view illustrating an exemplary configuration of a rotary power generator.
Figure 9:
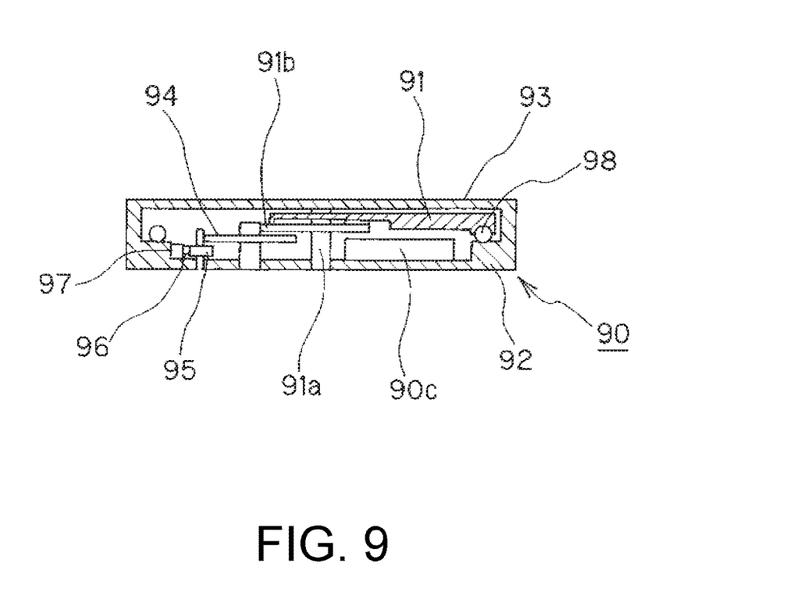
FIG. 9 is a cross-sectional view of the rotary power generator shown in FIG. 8.

FIG. 8 is a plan view illustrating an exemplary configuration of the rotary power generator, and FIG. 9 is a cross-sectional view of the rotary power generator shown in FIG. 8. As shown in FIG. 8, the rotary power generator 90 includes a power generation mechanism 90a, a voltage control circuit 90b, and a capacitor 90c. The power generation mechanism 90a is configured to generate power using rotation of a rotating weight 91 caused by the motions of a user's arm.

As shown in FIGS. 8 and 9, the power generation mechanism 90a is provided with a case including a base 92 and a cover 93, and a rotating weight 91 that rotates about a rotating shaft 91a fixed to the base 92 is provided inside this case. The rotating weight 91 is shaped such that the center of gravity thereof is largely shifted from the position of the rotating shaft 91a. Furthermore, a gear 91b is fixed to the rotating weight 91, and the gear 91b rotates along with the rotation of the rotating weight 91.

Also, a relay gear 94 that is rotated by the rotation of the gear 91b, and a power generation rotor 95 that is rotated by the rotation of the relay gear 94 are provided inside the case. The gear 91b and the relay gear 94 constitute a rotational motion transmission mechanism, which is referred to as a train wheel mechanism in general. The power generation rotor 95 includes a rotating shaft and permanent magnets that are fixed to the rotating shaft such that N poles and S poles are arranged alternatingly.

Furthermore, a substantially C-shaped stator 96 made of a high permeability material is arranged such that the power generation rotor 95 is sandwiched between two ends of the stator 96, and a conducting wire is wound around the stator 96 to form a coil 97 at the central portion thereof. Also, a bearing 98 that rotatably supports the rotating weight 91 is arranged between the rotating weight 91 and the base 92, and the voltage control circuit 90b and the capacitor 90c are arranged in a hollow space of the base 92 around the rotating shaft 91a.

When the rotating weight 91 is rotated due to the motion of a user's arm or the like, in such a power generation mechanism 90a, this rotational motion is transmitted to the power generation rotor 95 so as to rotate the power generation rotor 95, and the permanent magnets of the power generation rotor 95 are also rotated. Accordingly, the N poles and the S poles alternatingly oppose the two ends of the stator 96, and when the N pole and the S pole of one of the permanent magnets respectively oppose the two ends of the stator 96, a magnetic flux from the N pole of the permanent magnet passes through the inside of the stator 96 and reaches the S pole.

Accordingly, the magnetic flux passes through the coil 97 along the winding axis of the coil 97. Also, the direction of the magnetic flux that passes through the coil 97 inverts according to the rotation of the power generation rotor 95. As a result, an induced electromotive force is generated in the coil 97 according to the Lenz's law, and an electric current is generated. An AC voltage is output from the two ends of the coil 97 according to the rotation of the rotating weight 91.

On the other hand, the temperature difference power generator generates power by making use of a temperature difference using a thermoelectric element (Seebeck element). Power is generated by the temperature difference power generator that makes use of a temperature difference between the body temperature of the user and the temperature of the outside air or the case of a wearable apparatus (on a front surface side, for example), in order to obtain the energy source for the wearable apparatus.

Figure 10:
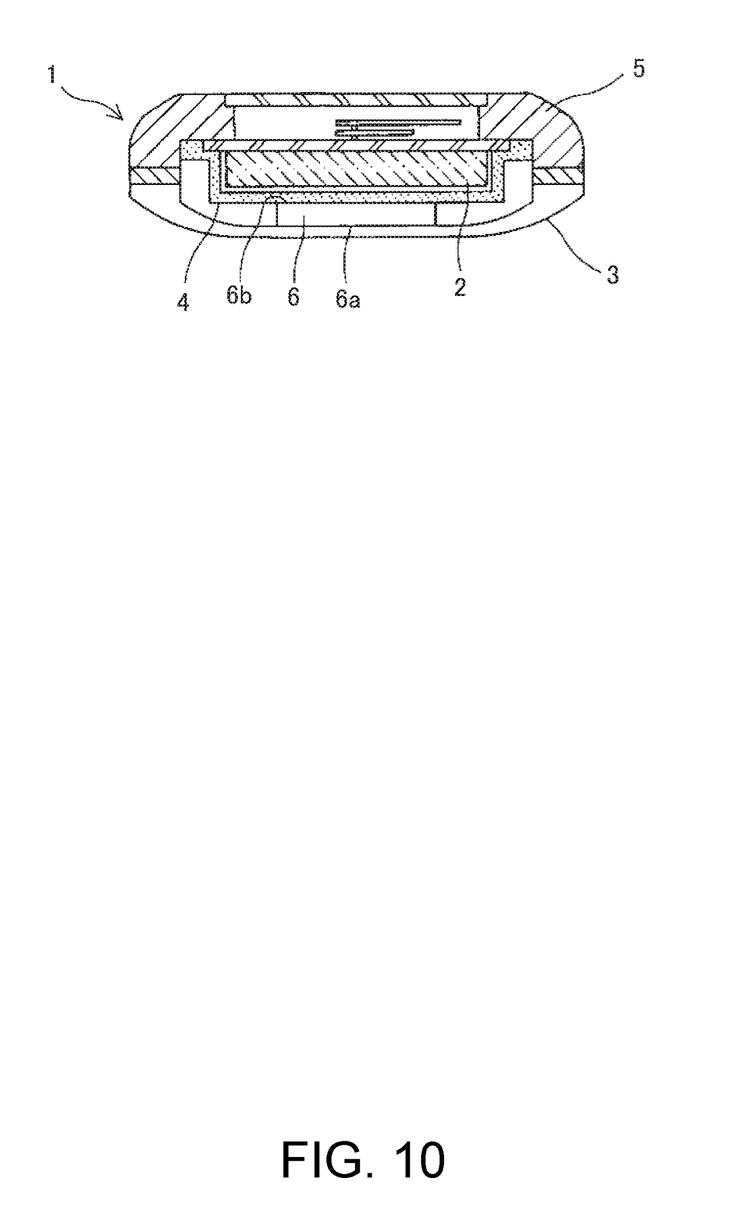
FIG. 10 is a cross-sectional view illustrating an exemplary configuration of a wrist watch device that uses a temperature difference power generator.

FIG. 10 is a cross-sectional view illustrating an exemplary configuration of a wrist watch device that uses the temperature difference power generator. As shown in FIG. 10, a temperature difference power generator 6 is installed between a clocking module 2 that performs clocking and moving of hands of a wrist watch device 1 and a back cover 3. Also, a hot contact 6a of the temperature difference power generator 6 is connected to the back cover 3, and a cold contact 6b is connected to a case 5 via a thermal conductor 4 such as a module cover.

In the temperature difference power generator 6, a plurality of pairs of a P-type semiconductor material and an N-type semiconductor material of a bismuth-tellurium (Bi—Te) base (thermoelectric elements), for example, are interposed between two support substrates that are thermally conductive and constitute the hot contact 6a and the cold contact 6b. These semiconductor materials are connected in series via electrodes so as to generate a predetermined electromotive force. When a temperature difference occurs between the hot contact 6a and the cold contact 6b, a DC voltage is output from two ends of the temperature difference power generator 6.

In the above-described embodiments, a case where the invention is applied to a mobile information processing device has been described, but the invention can also be applied to general charging ICs and power management ICs that are to be applied to rechargeable batteries. The invention is not limited to the embodiments described above, and many modifications can be made within the scope of technical idea of the invention by a person having ordinary skill in the art.

This application claims priority from Japanese Patent Application No. 2017-227557 filed in the Japanese Patent Office on Nov. 28, 2017, the entire disclosure of which is hereby incorporated by reference in its entirely.

What is claimed is:

1. A mobile information processing device comprising:
a power generator configured to generate electric power;
a secondary battery configured to store electric power;
a power feeding circuit configured to supply electric power generated by the power generator to the secondary battery;
an electronic circuit to which electric power is supplied from the secondary battery;
an over-discharge detection circuit that is supplied with electric power from the secondary battery, and Is configured to detect whether or not the secondary battery is in an over-discharged state, and upon detecting that the secondary battery is in an over-discharged state over a predetermined period, stop a detection operation according to an enable signal; and
a power down cancel circuit configured to, when the over-discharge detection circuit has stopped the detection operation, cause the over-discharge detection circuit to re-start the detection operation when a current supplied to a detection terminal from the power feeding circuit is more than a predetermined current.

2. An integrated circuit comprising:
an over-discharge detection circuit that is supplied with electric power from a secondary battery, and is configured to detect whether or not the secondary battery is in an over-discharged state, and upon detecting that the secondary battery is in an over-discharged state over a predetermined period, stop a detection operation according to an enable signal; and
a power down cancel circuit configured to, when the over-discharge detection circuit has stopped the detection operation, cause the over-discharge detection circuit to re-start the detection operation when a current supplied from a power feeding circuit to a detection terminal is more than a predetermined current.

3. The integrated circuit according to claim 2, wherein the predetermined current is greater than or equal to a consumption current of the over-discharge detection circuit.

4. The integrated circuit according to claim 2, wherein the power down cancel circuit includes a first resistor through which a current supplied to the detection terminal from the power feeding circuit flows when the secondary battery has been detected to be in an over-discharged state over the predetermined period, and is configured to, when a voltage across the first resistor is more than a predetermined voltage, activate a power down cancel signal, and cause the over-discharge detection circuit to re-start the detection operation.

5. The integrated circuit according to claim 4, wherein the power down cancel circuit further includes a first transistor, a second resistor, and a second transistor that are connected in series between a positive electrode and a negative electrode of the secondary battery, the first transistor is turned on when the secondary battery has been detected to be in an over-discharged state over the predetermined period, and the second transistor is turned on when a voltage across the first resistor is more than the predetermined voltage and activates the power down cancel signal.

6. The integrated circuit according to claim 4, further comprising:
an oscillator circuit configured to, when the power down cancel signal is activated, perform an oscillation operation and generate a clock signal, and when the power down cancel signal is deactivated, stop the oscillation operation; and
a control circuit configured to, when the secondary battery has been detected to be in an over-discharged state over the predetermined period, deactivate the enable signal so as to cause the over-discharge detection circuit to stop the detection operation, and thereafter, when the power down cancel signal is activated, generate the enable signal in synchronization with the clock signal so as to cause the over-discharge detection circuit to operate intermittently.

7. A battery pack comprising:
the integrated circuit according to claim 2; and
the secondary battery.

* * * * *